United States Patent

Dastur

[11] 3,758,257
[45] Sept. 11, 1973

[54] REDUCTION OF MICROORGANISM POPULATIONS OF FOOD ARTICLES BY CONTACT WITH A LIQUID CHLOROHYDROCARBON

[75] Inventor: Kavsy D. Dastur, Yorklyn, Del.

[73] Assignee: E. I. du Pont de Nemours and Company, Wilmington, Del.

[22] Filed: July 1, 1970

[21] Appl. No.: 51,609

[52] U.S. Cl. ............... 426/331, 21/58, 426/429, 426/430, 426/442, 426/321
[51] Int. Cl. ............................ A23l 3/34, A23l 3/36
[58] Field of Search .................. 99/198, 222, 150 R, 99/150 A, 218, 192, 158; 21/58; 424/350

[56] References Cited
UNITED STATES PATENTS

| | | | |
|---|---|---|---|
| 3,097,099 | 7/1963 | Beckmann | 99/158 X |
| 3,368,363 | 2/1968 | Alaburda et al. | 99/198 X |
| 1,617,630 | 2/1927 | Gay | 99/198 |
| 2,225,669 | 12/1940 | Taylor | 99/198 X |
| 3,483,003 | 12/1969 | Ziffer et al. | 99/150 |
| 3,377,941 | 4/1968 | Jaremus | 99/218 X |
| 3,486,345 | 12/1969 | Waldin | 99/198 X |

OTHER PUBLICATIONS

Hackh's Chemical Dictionary, 4th Edition, McGraw-Hill 1969, p. 152-153.
Rentschler, "Bactericidal Effect of Ultraviolet Radiation", Reprinted from the Journal of Bacteriology, Vol. 41, No. 6, June 1941, p. 745, 757.

Primary Examiner—S. Leon Bashore
Assistant Examiner—Alfred D'Andrea, Jr.
Attorney—Louis H. Rombach

[57] ABSTRACT

A continuous process for reducing microorganism populations of articles, especially food, comprising effectively contacting the surfaces of the articles with a liquid, saturated fluorinated chlorohydrocarbon having a normal boiling point of 50°C. to −50°C., collecting liquid chlorohydrocarbon which has contacted the articles, reducing the microorganism population of the collected liquid, and recycling the liquid of reduced microorganism population to the article contacting step.

14 Claims, 3 Drawing Figures

FIG. 3

INVENTOR
KAVSY D. DASTUR

BY

ATTORNEY 3,758,257

REDUCTION OF MICROORGANISM POPULATIONS OF FOOD ARTICLES BY CONTACT WITH A LIQUID CHLOROHYDROCARBON

BACKGROUND OF THE INVENTION

1. Field of the Invention

This invention relates to a continuous process for the reduction of microorganism populations of articles, expecially foods, by contacting the articles with liquid, saturated chlorohydrocarbons.

2. Description of the Prior Art

The freezing or chilling of foods to preserve them is an ancient art. Modern means comprise directly contacting the food with liquid chillants and ebullient freezants. These liquids permit the rapid chilling or freezing of foods of all kinds due to excellent heat transfer from the food to the freezing medium. Such processes are considerably faster than are processes which depend on heat transfer from the food to gases, as in conventional static and tunnel air blast freezers.

The use of water or aqueous mixtures, for example, aqueous salt or sugar solutions, in direct contact chilling and/or freezing processes is well known. Such liquids for chilling foods are disclosed by Zebarth et al. in U.S. Pat. No. 3,363,638; by Gay in U.S. Pat. No. 1,617,630; and by Lenhart et al. in "Food Industries", April, 1949, pages 442–444. The use of non-aqueous liquids, for example, propylene glycol, is disclosed by Zebarth in U.S. Pat. No. 3,006,774 and by Zebarth et al. in U.S. Pat. No. 3,315,489. Colton in U.S. Pat. No. 2,751,762 discloses a process of using a chilled mixture of a halogenated hydrocarbon, for example, trifluorotrichloroethane, and a hydrocarbon, for example, n-heptane, in the direct contact freezing of materials.

In recent years ebullient liquids have come into use for direct contact freezing of materials. The ebullient freezants are inert materials of sufficiently low boiling point that the material is frozen by direct contact with the boiling freezant or with the cold vapors of the boiling freezant. Such freezants for freezing food and other materials include carbon dioxide, nitrous oxide, ammonia, sulfur dioxide and nitrogen.

Robillard in U.S. Pat. No. 2,059,970 discloses the freezing of food by directly contacting the food with an ebullient, liquid, fluorine-containing, halogenated alkane freezant. Other direct contact processes for freezing foods include the process disclosed by Alaburda et al. in U.S. Pat. No. 3,368,363, employing a closed vessel, and the process disclosed by Waldin in U.S. Pat. No. 3,498,069, employing a freezing vessel and condenser which operate at atmospheric pressure. The use of dichlorodifluoromethane, one of the freezants disclosed by Waldin, has been approved by the United States Food and Drug Administration for direct contact freezing of foods ("Federal Register", Vol. 32, Title 21, Food and Drugs, Sept. 8, 1967).

The prior art has given some consideration to the problem of microorganism growth in aqueous freezants and chillants. Gay, cited above, discloses the inclusion of chemicals, such as sodium benzoate, to retard bacteria growth. Lenhart et al., cited above, disclose the use of acetic acid, propionic acid, benzoic acid, alcohol, sodium benzoate or germicidal light to inhibit the growth of organisms in sugar-type media. Such chemicals which provide an acidic aqueous medium are particularly effective against pH sensitive organisms, for example, bacteria and/or other organisms which may not be able to survive in acidic media, such as at a pH of less than 6 to 6.5. It also has been recognized in the art that microorganism populations of foods can be reduced to some extent by means of thermal shock and/or anoxia. Thermal shock may occur when the microorganisms are contacted with a cold liquid, for example, cryogenic liquids such as liquid nitrogen. Although aerobic bacteria can be reduced by anoxia, most prior art food freezing processes do not operate at sufficiently low oxygen levels for sufficiently long periods of time to permit reduction of food microorganisms by this means. It is obvious from the above that there is need for a continuous process wherein microorganism populations of articles, especially foods, can be reduced.

OBJECTS AND SUMMARY OF THE INVENTION

It is an object of the present invention to provide a continuous process for reducing microorganism populations of articles, expecially foods. Another object is to provide such a process which employs non-aqueous media. Still another object is to provide such a process which can be integrated with prior art, direct contact, continuous heat extracting processes employing recoverable, non-aqueous heat transfer agents.

The above objects are achieved by means of a continuous process comprising effectively contacting the surfaces of the articles with a liquid, saturated fluorinated chlorohydrocarbon having a normal boiling point of 50° to −50°C., collecting liquid chlorohydrocarbon which has contacted the articles, reducing the microorganism population of the collected liquid chlorohydrocarbon, and recycling the liquid chlorohydrocarbon of reduced microorganism population to the article contacting step.

DESCRIPTION OF THE INVENTION

The invention resides in a continuous process for reducing microorganism populations of articles, especially foods, the process comprising effectively contacting the surfaces of the articles with a liquid, saturated fluorinated chlorohydrocarbon having a normal boiling point of 50°C. to −50°C., collecting liquid chlorohydrocarbon which has contacted the articles, reducing the microorganism population of the collected liquid chlorohydrocarbon, and recycling the liquid chlorohydrocarbon of reduced microorganism population to the article contacting step.

The reduction of microorganism populations of the collected fluorinated chlorohydrocarbon can be achieved by any of a variety of means, including the addition of an effective amount of an acid producing material, chlorine, bromine or iodine, by bactericidal irradiation and by flotation purification.

The basis of the present invention resides in the discovery that it is possible to remove microorganisms from articles continuously by effectively contacting their surfaces with certain specially treated liquid fluorinated chlorohydrocarbons. The effectiveness of the process in removing microorganisms from the articles depends upon a plurality of factors, including the type and nature of the articles, the microorganism population of the articles being treated, the microorganism population of the liquid chlorohydrocarbon before and after contacting the articles, and the nature of the contact between the articles and the liquid chlorohydrocarbon. For example, articles having complex irregular surfaces may be more difficult to treat effectively, in which case agitation can be employed to facilitate contact between the liquid chlorohydrocarbon and the articles. Low levels of microorganisms are reduced only by use of nearly sterile liquid chlorohydrocarbon. Treatment by this invention is effective as long as the liquid chlorohydrocarbon contacting the articles contains fewer microorganisms per unit volume than the liquid chlorohydrocarbon which is collected after it has contacted the articles. Because of the dependence of the process on so many variables no absolute value can be assigned to the microorganism population of the input chlorohydrocarbon which contacts the articles. It has been established, however, that for constant conditions of operation, that is, when articles of the same type, size, shape and microorganism population are treated under essentially constant contacting conditions, there is a critical or threshold level of microorganism population in the input liquid chlorohydrocarbon. At this critical level, articles will leave the system with substantially the same number of microoganisms that they had upon entry. If the microorganism population of the input liquid chlorohydrocarbon is below the critical level, articles can be treated effectively by this invention. If the microorganism content of the input liquid chlorohydrocarbon is above the critical level, the microorganism population of the articles will increase upon being contacted with the chlorohydrocarbon.

Generally, the articles which are treated by the process of this invention are foods. Moreover, since foods which are treated by this invention generally are foods which are to be frozen, the process of this invention usually is carried out in an integrated fashion with the food freezing operation. Although it is intended that the present invention not be limited in its utility to food contacting operations, for simplification, the description which follows may include a description of a food contacting system, and more specifically, a food contacting system wherein the food not only is treated to reduce microorganism populations but is frozen simultaneously. An expecially desirable food freezing system with which the process of this invention can be integrated is that of Waldin as described in U.S. Pat. No. 3,498,069. Any foods which can be subjected to heat extraction by the process described by Waldin can be treated by the process of the present invention.

The liquid, saturated fluorinated chlorohydrocarbons used in the present invention are alkanes of one or two carbon atoms and substituted with at least one chlorine atom and at least one fluorine atom. They have boiling points at normal atmospheric pressure of 50° to −50°C. and are characterized by high stability toward hydrolysis, low toxicity, low surface tension, low heat of vaporization and low solubility for food lipids. Mixtures of the aforesaid liquids, including azeotropic mixtures, can be employed in the present invention. Examples of liquids useful herein include dichlorofluoromethane, dichlorodifluoromethane, trichlorofluoromethane, 1,2-dichloro-1,1,2,2-tetrafluoroethane, 1,1,2-trichloro-1,2,2-trifluoroethane, chloropentafluoroethane and the azeotropic 51:49 mixture, by weight, of chloropentafluoroethane and chlorodifluoromethane.

As indicated hereinabove, effective reduction of microorganism populations of articles by means of the present invention requires that the microorganism population of the liquid contacting the articles must be less per unit volume than that of liquid which is recovered immediately after contacting the articles. A variety of means can be employed to reduce the level of microorganisms in the recovered liquid to a sufficiently low level so that it can be reused or recycled to contact articles entering the system. These means include the addition of an effective amount of an acid producing material, chlorine, bromine or iodine; bactericidal irradiation; and flotation purification. The preferred means are ultraviolet light irradiation and flotation purification. Although each of these means will be more fully described in the examples, following is a brief description of each.

An effective amount of an acid producing material, that is, any chemical which can provide an acidic aqueous medium, can be added to the recovered liquid to reduce the populations of organisms which do not survive under the acidic conditions achieved. In completely non-aqueous systems, that is, systems free of liquid water, an effective amount of propionic acid is employed. For such systems propionic acid is required since it is effective against organisms which are not pH sensitive, and it is dependent upon an acidic aqueous medium for its effectiveness.

The populations of organisms in the recovered liquid also can be reduced by addition of an effective amount of chlorine, bromine or iodine; chlorine is preferred. Agents such as ethylene oxide, propylene oxide and ehtanol are inoperable herein in non-aqueous systems, that is, systems free of liquid water. The amount of acid producing material or halogen which is required will depend on the variety of factors discussed above. Furthermore, the amount of the agent added can vary somewhat with the location at which it is added. If the addition is made to the recovered liquid in a separate chamber or zone, that is, in a chamber or zone other than that in which the articles are being contacted, higher amounts can be employed. Preferably, when foods are being treated, the agent is added to the recovered liquid in a separate chamber or zone, and the treated liquid is separated from the treating agent before being recycled to the input stage of the system. Such a mode of operation precludes, for example, the interaction of acid and food, which interaction may affect the taste and odor of food, especially delicate foods. Particularly in the case of chlorine, such a mode of operation minimizes corrosion of the food-contacting chamber due to the corrosion-inducing character of chlorine. Contamination of food and/or alteration of its color, taste or odor due to the presence of corrosion by-products is correspondingly minimized. Moreover, since chlorine's effectiveness is markedly reduced in the presence of foods, for this reason also when such articles are treated, the treatment of the recovered liquid chlorohydrocarbon with chlorine preferably is carried out in a separate chamber or zone.

When propionic acid is employed, generally, the amount added to the liquid in the contact zone does not exceed 5 weight percent and when chlorine is employed, the amount added in the contact zone usually exceeds 0.01 weight percent (100 parts per million). If chlorine is added to the liquid in a separate chamber or zone, the preferred amount is about 5 weight percent.

Another means of reducing microorganism populations of liquid chlorohydrocarbon after it has contacted the articles involves flotation purification. It has been discovered that if the contacting liquid is withdrawn from the chamber or zone of contact and allowed to form a quiescent pool in a separate zone or chamber, the microorganisms will concentrate in the upper regions of the pool. The liquid which is withdrawn from the lower regions of the pool has a reduced microorganism population. The extent of the reduction in the lower regions varies with time. Noticeable reductions are observable immediately and within 30 minutes reductions to 1 percent of the initial populations can be realized. After two hours essentially sterile liquid can be recovered from the lower regions of a quiescent pool.

In the operation of a flotation purification system, various means can be employed to separate the recovered contact liquid into a pure fraction and a contaminated fraction. For example, instead of withdrawing a pure fraction from the lower regions of a quiescent pool, the contaminated fraction can be withdrawn from the upper regions of said pool. Moreover, the two fractions can be separated by centrifugal techniques, by means of vacuum devices, by use of a wiped weir, and the like. The separation into fractions can be carried out stepwise. For example, after an initial separation into the two fractions, the contaminated fraction can be further separated into a more contaminated fraction and a pure fraction, the latter also being recycled to the article contacting step. It is to be understood that any contaminated fraction can be purified by any of the other means disclosed herein for reducing microorganisms. Any of the aforesaid more rapid separating techniques may be preferable when it is desired to utilize flotation purification in conjunction with food treating processes and other processes which require rapid recycle of contact liquid.

Flotation purification has been found particularly amenable to integration with the continuous heat extraction process and apparatus described by Waldin in U.S. Pat. No. 3,498,069.

Still another means of reducing microorganism populations of liquid chlorohydrocarbon after it has contacted the articles involves bactericidal irradiation of the liquid. Any bactericidal radiation can be used, for example, ultraviolet light and gamma rays. The specific type employed will be determined from considerations of the effect to be achieved, the site of irradiation, safety considerations, and the like. Radiation which has a deleterious effect on the articles will not be used if the recovered liquid is to be irradiated when the articles are within radiation distance. Radiation of a type which may deleteriously affect the liquid chlorohydrocarbon also will be avoided. As already indicated, ultraviolet light is preferred. Any conventional ultraviolet light source can be used and the conditions of irradiation can be determined readily to reduce the level of microorganism population to that desired. For example, the intensity of the light can be adjusted in accordance with considerations given to the amount of contamination in the liquid, the thickness of the liquid being irradiated and the time of irradiation. By way of specific example, irradiation intensities of 1 to $3 \times 10^5$ microwatt seconds/cm.$^2$, employing dichlorodifluoromethane or 1,2-dichloro-1,1,2,2-tetrafluoroethane in 10 cm. thickness, can provide a 90 to 100 percent reduction of microorganism populations in ½ to 5 minutes. The liquid can be irradiated in the article contacting zone or in a separate chamber or zone. Preferably, the liquid should be ebullient or agitated. Since the output of germicidally-active light varies directly with temperature in conventional low pressure mercury ultraviolet lamps, excessive cooling of the lamp should be avoided. Moreover, since foods may develop off-odors or tastes when irradiated with ultraviolet light, direct irradiation of foods should be minimized or avoided entirely. Similarly, irradiation of any debris in the collected liquid chlorohydrocarbon may provide undesirable effects.

DETAILED DESCRIPTION OF THE DRAWINGS

Figure 1:
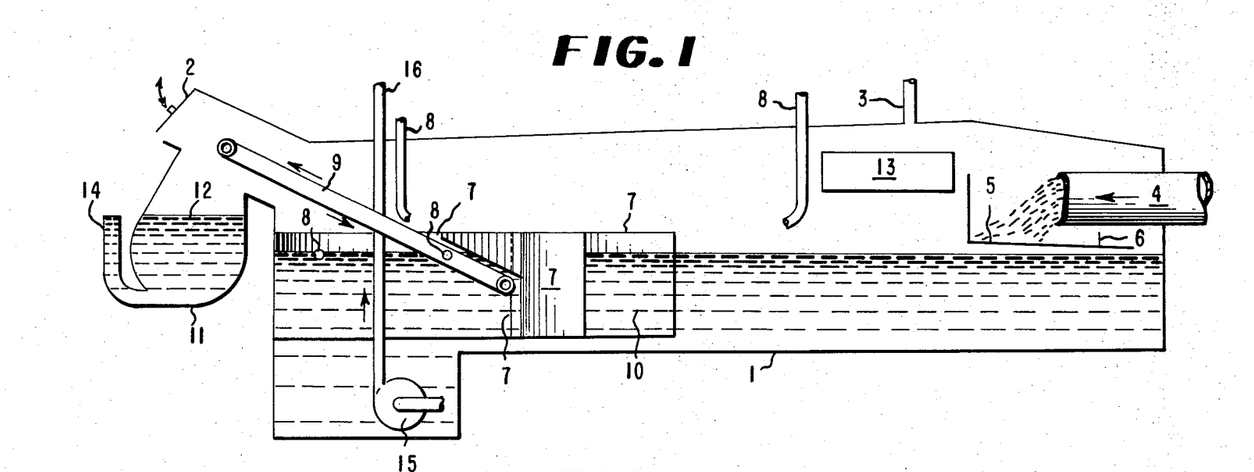
FIG. 1 is a schematic elevation of a flotation purification device which can be used in the present invention.
Figure 2:
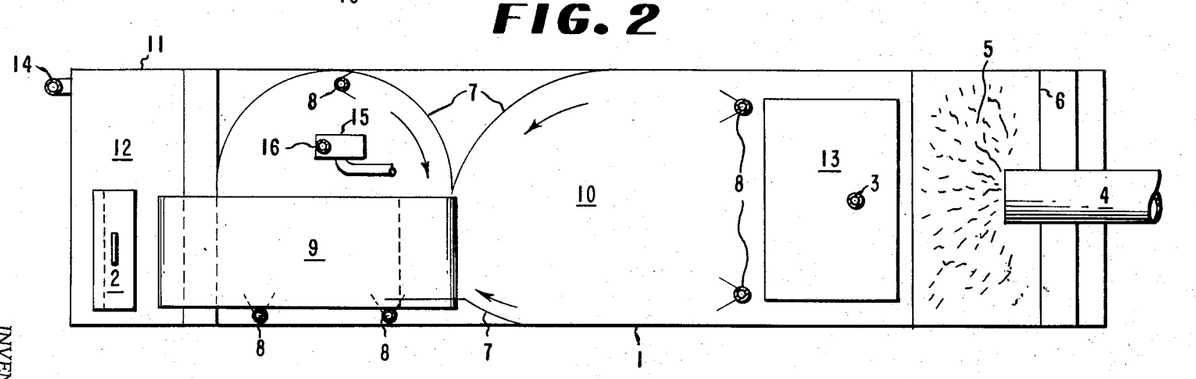
FIG. 2 shows a top view of the device with the top wall removed.
Figure 3:
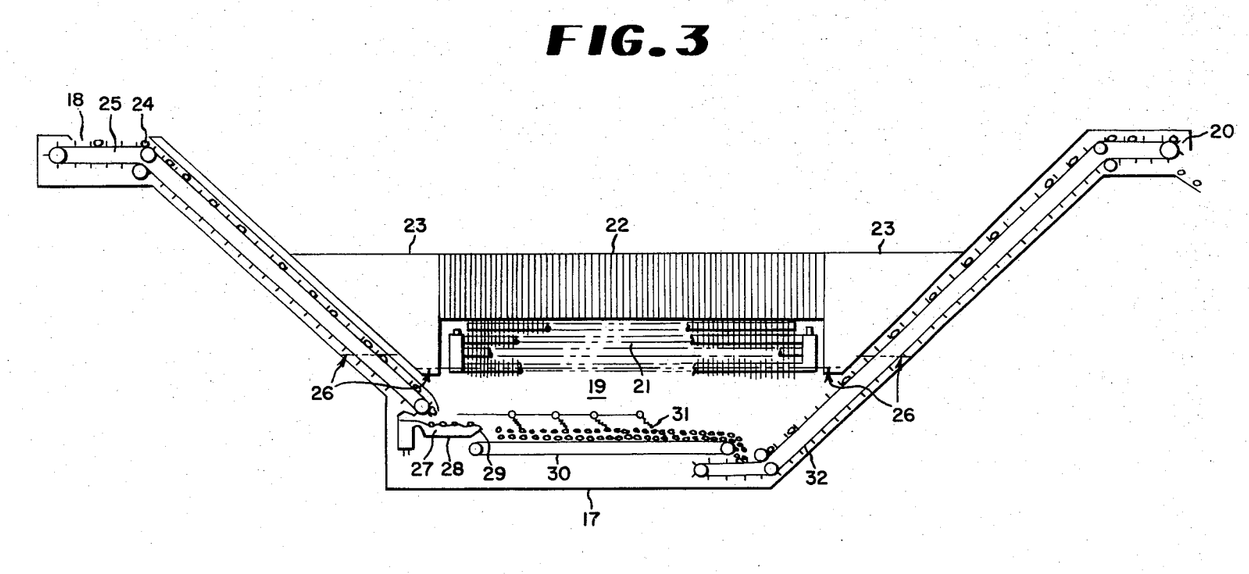
FIG. 3 is a schematic elevation of a heat extraction vessel of U.S. Pat. No. 3,498,069, which vessel is amenable to integrated use with the device of FIGS. 1 and 2.

Following is a description of the flotation purification device which is represented by FIGS. 1 and 2, the description including the integrated use of such a device in a heat extracting process and apparatus disclosed by Waldin in U.S. Pat. No. 3,498,069 as represented by FIG. 3.

In FIGS. 1 and 2 housing 1 encloses the system which is without direct communication with the atmosphere except through the clean-out port 2 which normally is closed during operation, and through vent 3 which serves to equilibrate the pressure within the device with that of the atmosphere. It is preferred to terminate the pipeline leading from vent 3 in the vapor space of the heat extracting apparatus to which the flotation purification device is connected. When clean-out port 2 is open, it is preferred to actuate a pump (not shown) in the pipeline leading from 3 to ensure flow of freezant vapor in the direction of the heat extracting apparatus so as to prevent vapor loss through clean-out port 2.

More specifically, employing dichlorodifluoromethane as the contact liquid and heat extracting agent, microorganism-contaminated dichlorodifluoromethane is withdrawn continuously from the housing of the heat extracting apparatus to which the flotation purification device is connected. The dichlorodifluoromethane enters the device through inlet pipe 4. The inside diameter of the inlet pipe is made as large as is practical so as to minimize turbulence. The end wall of trough 5 acts to reduce the kinetic energy of the inlet stream by requiring the stream to reverse direction and flow quietly over the low weir 6 along the width of the device.

Baffles 7 and sprays 8 gently urge any floating material to the area above the submerged end of foraminous belt 9. The baffles may extend to the bottom of housing 1 or may terminate some distance above the bottom of the housing as shown in FIG. 1. As liquid dichlorodifluoromethane 10 moves in a slow non-turbulent manner from the region of weir 6 to the region of the foraminous belt, debris, dichlorodifluoromethane hydrate and microorganisms float to the upper layers of the liquid. The foraminous belt rising from beneath the surface of the liquid picks up floating material from the liquid and carries it to debris collector 11. The debris collector, unlike the rest of the equipment, is uninsulated and contains water 12 at or near room temperature. The dichlorodifluoromethane hydrate decomposes in the relatively warm debris collector, the dichlorodifluoromethane vapor returning to the main housing via the space around the foraminous belt and the hydrate water, debris and the bulk of the microorganisms remaining behind in the debris collector. Dichlorodifluoromethane vapor generated by this operation and by evaporation of the liquid in other parts of the device are condensed by condenser 13. Condenser 13 is of finned tubular construction and can be the evaporator of a conventional refrigeration system. In the use of dichlorodifluoromethane, ammonia is preferred as refrigerant and the condenser surface temperature is maintained at about −45°C.

Water seal 14 maintains the level of water in the debris collector. Excess water and associated microorganisms flow through the water seal and are discarded. Solid debris is removed from time to time through clean-out port 2.

Dichlorodifluoromethane of reduced microorganism population and from which debris has been removed is withdrawn from a point near the bottom of housing 1 by pump 15 and returned via pipline 16 to the heat extracting apparatus to which the flotation device is connected. A part of the stream from pipeline 16 can be diverted to feed the sprays 8.

FIG. 3 is a schematic elevation showing the principal parts of a heat extracting apparatus such as disclosed by Waldin in U.S. Pat. No. 3,498,069 for extracting heat from articles by the method of Waldin. The apparatus is enclosed on the bottom, sides and ends by an insulated, liquid-tight, heat extraction vessel 17. Entrance opening 18, heat extraction zone 19 and exit opening 20 are provided. Most of the top of the vessel is covered by a parallel finned, tube bundle, vapor condenser 21 which is the evaporator of an ordinary ammonia refrigeration system. Loss of freezant vapor from the space above the condenser is minimized by retarding thermal convection and ambient air currents in this area. This is achieved by providing a quiescent zone above the condenser by means of phenolic resin impregnated paper honeycomb structure 22. The zone between the honeycomb structure and the entrance and exit openings is closed with sections of closed-cell insulating material 23.

Food particles 24 are carried by entrance conveyor 25 downward through an air / freezant vapor interface 26 into the freezing zone. The entrance conveyor is of wire mesh construction and has cleats.

The articles free-fall into a body of liquid freezant 27 contained in pan 28; if the articles are food particles, a frozen crust is formed on each particle. The flow of liquid freezant in pan 28 carries the articles over spill point 29 onto conveyor 30 of construction similar to the entrance conveyor but having no cleats; the articles are carried under freezant sprays 31 where heat extraction is completed. At the end of conveyor 30 the articles fall onto exit conveyor 32 fitted with cleats and are carried upward through the air/freezant vapor interface 26 and out through the exit opening.

Freezant vapor evolved from pan 28 or elsewhere in the heat extraction zone is condensed by vapor condenser 21. Freezant collected in housing 17 is withdrawn and directed to the inlet of the previously described flotation device of FIGS. 1 and 2. Freezant returned from the flotation device via pipeline 16 of FIGS. 1 and 2 supplies freezant to pan 28 and sprays 31 of the heat extraction apparatus of FIG. 3.

The examples which are provided herein are intended only as demonstrations of the general principles of the invention and are not to be construed as limitations of utility. In the examples pure strain cultures were prepared from a commercial slant of pure strain organisms by transferring a loopful of organisms aseptically to a sterile aqueous broth consisting of, on a weight basis, 0.3 percent beef extract and 0.5 percent peptone. The broth was incubated with shaking at 37°C. for about 16 hours. The organisms, harvested by centrifuging, were washed several times with Butterfield's diluent and resuspended in that medium. The suspensions, except as noted, were used to contmainate food used in the examples.

Butterfield's diluent was prepared by diluting 1.25 ml. of a stock solution to 1 liter with distilled water and then autoclaving at 120°C. for 15 minutes. The stock solution was prepared by dissolving 34 grams of $KH_2PO_4$ in 500 ml. of distilled water, adjusting the pH to 7.2 with about 175 ml. of 1 N-sodium hydroxide, and then diluting to 1 liter with distilled water; the solution was stored under refrigeration.

Unless stated otherwise, the microorganism population of liquid chlorohydrocarbon was determined by aseptically evaporating one liter of liquid, suspending the residue in Butterfield's diluent, and plating for colony counting in successive dilutions on aqueous agar plates comprising, on a weight basis, 0.5 percent tryptone, 0.25 percent yeast extract, 0.1 percent glucose and 1.5 percent agar.

Unless stated otherwise, the microorganism population of food was determined by aseptically transferring a 50 gram sample to a sterile blender jar, homogenizing the sample in 450 ml. of Butterfield's diluent, and plating for colony counting as described above.

EXAMPLE 1

This example demonstrates the reduction of microorganism populations of food by contact with liquid chlorohydrocarbons of lesser microorganism population than the liquid after contact with the food. Part (a) describes the reduction of the natural organism population of kernel corn. Part (b) describes the reduction of the natural organism population of kernel corn plus an artifically added high population of *E. coli*.

The organisms comprising the natural organism population of corn are thought to be strains of *Escherichia*, *Clostridia*, *Aerobacter*, *Achromobacter*, *Erwinia*, and *Bacillus*.

The chlorohydrocarbons, except for 1,1,2-trichloro-1,2,2-trifluoroethane, were applied at their boiling points. The trichlorotrifluoroethane was applied at about 23°C.

TABLE 1

| Liquid | Boiling Point (°C.) |
|---|---|
| (1) Dichlorodifluoromethane | −29.8 |
| (2) 1,2-Dichlorotetrafluoroethane | 3.6 |
| (3) 1,1,2-Trichloro-1,2,2-trifluoroethane | 47.6 |
| (4) Chloropentafluoroethane | −38.7 |
| (5) Chloropentafluoroethane/chlorodifluoromethane azeotrope (51/49 by wt.) | −45.6 |

The corn was frozen by the liquids boiling at temperatures below 0°C. and was chilled by 1,2-dichlorotetrafluoroethane; with 1,1,2-trichloro-1,2,2- trifluoroethane there was essentially no heat exchange between the corn and the liquid.

a. Natural Microorganisms 3.5 Liters of each of the liquids listed in Table 1 were placed at atmospheric pressure in large sterile beakers; all but 1,1,2-trichloro-1,2,2-trifluoroethane were ebullient. To each beaker was added 300 g. of fresh kernel corn. After stirring for ten minutes, the corn was aseptically removed and, after homogenization, its microorganism population was determined. Representative samples of untreated food and liquid were also assayed for microorganism population.

The results are shown in Table 2.

TABLE 2

Assay (Natural Flora)

| Liquid | Liquid (Organisms/Liter) | | Food (Organisms/Gram) | |
|---|---|---|---|---|
| | Before Contact with food | After Contact with food | Before Contact | After Contact |
| (1) | <20 | $1.3 \times 10^3$ | $2.8 \times 10^7$ | $2.0 \times 10^6$ |
| (2) | <20 | $1.6 \times 10^3$ | $3.9 \times 10^4$ | $1.3 \times 10^4$ |
| (3) | — | — | $1.4 \times 10^6$ | $6.6 \times 10^3$ |
| (4) | <20 | $2.3 \times 10^5$ | $7.5 \times 10^4$ | $4.6 \times 10^4$ |
| (5) | <20 | $2.4 \times 10^4$ | $7.5 \times 10^4$ | $2.6 \times 10^4$ |

<=less than b. Natural Microorganisms plus E. coli

Part (a) was repeated except that the corn, before treatment, was dipped in a Butterfield's diluent suspension of about $10^6$ organisms/ml. of E. coli. The wet corn was transferred directly to the liquids. The results are shown in Table 3.

TABLE 3

Assay (Natural Microorganisms plus E. coli)

| Liquid | Liquid (Organisms/Liter | | Food (Organisms/Gram) | |
|---|---|---|---|---|
| | Before Contact With Food | After Contact With Food | Before Contact | After Contact |
| (1) | <20 | $3 \times 10^5$ | $6.7 \times 10^6$ | $6.3 \times 10^3$ |
| (2) | <20 | $1.2 \times 10^7$ | $1.8 \times 10^6$ | $1.2 \times 10^8$ |
| (3) | — | — | $1.8 \times 10^6$ | $7.7 \times 10^6$ |
| (4) | <20 | $3.8 \times 10^8$ | $8.1 \times 10^7$ | $6.2 \times 10^7$ |
| (5) | <20 | $2.3 \times 10^8$ | $8.1 \times 10^7$ | $3.7 \times 10^7$ |

<=less than

EXAMPLE 2

This example demonstrates the role of the critical or threshold level of microorganism in the contacting liquid. The experiment consisted of contacting successive constant weight lots of sterile cut potatoes in ebullient dichlorodifluoromethane containing increasing populations of mixed organims. The increased populations were obtained by separately contacting highly contaminated carrots with the liquid. The microorganism populations of the dichlorodifluoromethane and of the frozen potatoes were measured after each potato contact.

It was found that the microorganism population of the carrot contacting liquid rose to a critical value corresponding to the degree of contamination of the carrots, that is, beyond which the liquid could not be further contaminated on further contact with increasing amounts of carrots having the same level of contamination. This level, under the conditions of this experiment, was $6.6 \times 10^7$ organisms per liter of dichlorodifluoromethane. At this level the contaminated carrots left the liquid with the same net population which they had on entering the liquid. When the food entered liquid containing a population of microorganisms less than the critical value, organims were transferred from the food to the liquid and the food left the contact process with a lower population of organisms.

The microorganism population of the potatoes rose in succeeding lots with increasing contamination of the liquid and remained constant when the population in the liquid was constant at the level which, with respect to the contaminated carrots, was the critical or threshold level.

It is apparent from the results of this experiment that the organism population of the contacting liquid should be maintained at a level below the critical level so that net transfer is in the direction of food to liquid rather than in the other direction.

Experimental Details

In this experiment, raw, blanched diced carrots were contaminated by dipping in a broth comprising Excherichia coli, Salmonella typhosa, Staphylococcus aureus and Bacillus subtilis and containing about $10^6$ viable organisms per ml. The contaminated carrots were divided into 20 lots as follows:

TABLE 4

| Lot Nos. | Wt./lot(g.) |
|---|---|
| 1,2* | 50 |
| 3,4 | 50 |
| 5,6 | 100 |
| 7,8 | 150 |
| 9,10 | 200 |
| 11,12 | 250 |
| 13,14 | 300 |
| 15,16 | 300 |
| 17,18 | 300 |
| 19,20 | 300 |

*not contaminated

As indicated above, the contaminated carrots were used to contaminate the dichlorodifluoromethane employed in the contacting of the potatoes.

The actual contacting of food was carried out with 4.7 liters of dichlorodifluoromethane in an insulated open tank fitted with an efficient stirrer and a drain valve. Contacting was continued until ebullition ceased. At the beginning of the experiment the liquid was essentially sterile. After each even-numbered lot of carrots was removed, the volume of liquid was again raised to 4.7 liters with essentially sterile liquid, thus replacing that which was lost by evaporation, and 200 grams of potatoes (2 to 3 cm. cubes sterilized by autoclaving for 15 minutes under 2 atmospheres (absolute) steam pressure) were contacted in the same manner as were the carrots. After ebullition the potatoes were aseptically removed and a 0.5 liter sample of liquid was drawn off. Microorganisms in the liquid sample and in a representative 50 gram sample of potatoes were counted as described above.

The liquid was brought to the 4.7 liter level and the cycle was repeated with carrots and potatoes.

The data obtained, averages of triplicate microorganism counts, are given in Table 5. The data for the potatoes are given as organisms per 100 gram sample, that is, for twice the amount of potatoes actually assayed.

TABLE 5

| Following Carrot Lot No. | (Organisms/Liter) | Potato Cubes (Organisms/100 g.) |
|---|---|---|
| 2 | $2.9 \times 10^4$ | $<1.6 \times 10^5$ |
| 4 | $1.8 \times 10^6$ | $4.9 \times 10^5$ |
| 6 | $1.5 \times 10^7$ | $4.5 \times 10^6$ |
| 8 | $3.4 \times 10^7$ | $3.4 \times 10^6$ |
| 10 | $5.4 \times 10^7$ | $4.4 \times 10^6$ |
| 12 | $5.9 \times 10^7$ | $4.0 \times 10^6$ |

| | | |
|---|---|---|
| 14 | $6.6 \times 10^7$ | $3.9 \times 10^6$ |
| 16 | $6.6 \times 10^7$ | $5.9 \times 10^6$ |
| 18 | $6.3 \times 10^7$ | $4.6 \times 10^6$ |
| 20 | $6.6 \times 10^7$ | $4.3 \times 10^6$ |

<=less than

EXAMPLE 3

This example demonstrates the use of propionic acid as a means of reducing microorganism populations in contact liquids.

Kernel corn containing its natural organisms was treated in dichlorodifluoromethane in an insulated open top tank and then removed; the dichlorodifluoromethane was subjected to microorganism assay. Propionic acid (1 wt. percent) was added to the liquid; after stirring for 10 minutes the microorganism population of the liquid was again assayed. The entire experiment was repeated using 5 wt. percent of propionic acid. For the particular treating conditions employed the amount of propionic acid required to achieve a significant reduction in microorganism population was between 1 and 5 wt. percent.

EXPERIMENTAL DETAILS

Freshly cut kernel corn was allowed to stand overnight to approximate practical conditions and to increase the natural microorganism populations. 454 Grams of corn were placed in an insulated open top tank containing 4,900 grams of essentially sterile dichlorodifluoromethane. After stirring for 10 minutes the corn was removed and discarded. With continued stirring 1 liter (1,490 grams) of liquid was drained from the tank and filtered through a "Millipore" filter of 0.45 micron pore size. The filter paper was transferred to 25 ml. of sterile Butterfield's diluent. After vigorous shaking the suspension was plated serially in triplicate in the normal manner for organism count.

The liquid level in the tank was brought back to the original level with sterile dichlorodifluoromethane and 40 grams (1 wt. percent) of propionic acid were added. After stirring for 30 minutes one liter of liquid was drawn off for assay as before.

The experiment was repeated using 6,060 grams of dichlorodifluoromethane and 303 grams (5 wt. percent) of propionic acid.

The results are shown in Table 6.

TABLE 6

| | Sample No. 1 (organisms/liter) | Sample No. 2 (organisms/liter) |
|---|---|---|
| Contaminated Liquid | $1.62 \times 10^7$ | $8.9 \times 10^6$ |
| Liquid After Exposure to Propionic acid | $1.37 \times 10^7$ (after 1% acid) | $9.6 \times 10^3$ (after 5% acid) |

When the experiment was repeated in substantially the same manner using ethanol, ethylene oxide or propylene oxide in place of propionic acid, the desired reduction in microorganism population was not achieved.

EXAMPLE 4

This example demonstrates the use of chlorine as a means of reducing microorganism populations of the fluorinated chlorohydrocarbon contact liquids of this invention. Chlorine and dichlorodifluoromethane were charged, by weight, directly into storage cylinders. Since chlorine can be consumed by reaction with materials such as the walls of the cylinder in which it is stored, organic materials with which it comes in contact, and the like, the chlorine concentrations reported in this example for the dichlorodifluoromethane probably are in excess of the active concentrations.

a. Three liters of pure dichlorodifluoromethane were placed in a stainless steel beaker along with 200 grams of fresh kernel corn. Into another such beaker were placed 200 grams of fresh kernel corn and three liters of dichlorodifluoromethane containing 100 ppm. of chlorine. After the corn was frozen, a 500 ml. sample of liquid was removed from each beaker and allowed to evaporate to dryness in a sterile Erlenmeyer flask. The residue in each flask was dispersed in sterile Butterfield diluent and plated in successive dilutions by standard techniques for organism counting.

b. Part (a) was repeated except that uncooked, once-frozen commercial shrimp was used instead of corn and the dichlorodifluoromethane contained 250 ppm. of chlorine.

c. Part (a) was repeated except that the corn was replaced with once-frozen commercial shrimp which had been dipped in a normal saline suspension containing at least $10^6$ organisms/ml. of E. coli.

d. Part (c) was repeated except that the dichlorodifluoromethane contained 250 ppm. of chlorine.

The microorganism populations (organisms/liter) of the recovered untreated and chlorine-treated dichlorodifluoromethane are given in Table 7.

TABLE 7

| | untreated | untreated |
|---|---|---|
| (a) | $7.6 \times 10^6$ | 40 |
| (b) | $1.92 \times 10^3$ | 120 |
| (c) | $1.84 \times 10^3$ | 440 |
| (d) | $2.15 \times 10^3$ | 200 |

EXAMPLE 5

This example demonstrates the use of ultraviolet light irradiation as a means of reducing the microorganism population of the fluorinated chlorohydrocarbon contact liquids of this invention.

(a) About 8.9 liters of dichlorodifluoromethane were placed in an insulated open tank having a 20 cm. × 43 cm. base and equipped with a stirrer. The liquid was contaminated by freezing therein sliced carrots which had been dipped in a broth comprising E. coli, S. typhosa, and S. aureus at a level of about 10 organisms/ml. After removal of the frozen carrots the stirred liquid was irradiated from above with ultraviolet light provided by two General Electric G15T8 tubes, each having a non-reflecting light shade. The tubes where mounted along the longer axis of the tank at a distance of 30 cm. above the liquid. At this distance the combined radiant energy of the two lamps was about 818 microwatts/cm.$^2$.

At timed intervals 500 ml. samples of liquid were withdrawn and analyzed for microorganism count in a manner similar to that described in Example 4.

b. Part (a) was repeated using 1,2-dichloro-1,1,2,2-tetrafluoroethane as the contact liquid in place of dichlorodifluoromethane.

The effectiveness of the irradiation in destroying microorganisms in the contact liquid is shown by the data obtained from Parts (a) and (b) of this example. The data are given in Table 8. The numbers in parentheses are the percentages of microorganisms destroyed.

TABLE 8

| Irradiation Time (min.) | Dose[1] | Assay[2] (Part a) | (Part b) |
|---|---|---|---|

| | | | |
|---|---|---|---|
| 0 | — | $1.6\times10^6$ | $>1.5\times10^6$ |
| 0.5 | 2.5 | $1.3\times10^5$ (91.9) | $1.1\times10^6$ (>26.7) |
| 1 | 4.9 | $<1\times10^4$ (>99.4) | $2.2\times10^5$ (>85.3) |
| 2 | 9.8 | $<2\times10^3$ (>99.9) | $1.5\times10^5$ (>90.0) |
| 3 | 14.7 | | $6.0\times10^4$ (>96.0) |
| 5 | 24.5 | | $<3\times10^3$ (>99.8) |
| 7 | 34.4 | | $<3\times10^3$ (>99.8) |
| 10 | 49.1 | | $<1\times10^2$ (>99.99) |

[1] At the surface of the liquid in microwatt sec./cm.$^2 \times 10^{-4}$
[2] In organisms/liter
>=greater than
<=less than

EXAMPLE 6

This example demonstrates the use of flotation purification as a means of reducing the microorganism population of the fluorinated chlorohydrocarbon contact liquids of this invention. Contaminated liquid was allowed to remain quiescent for varying time periods; samples were withdrawn from the lower regions of the quiescent pool for assay.

Eight liters of dichlorodifluoromethane in an insulated trough were contaminated by repeatedly freezing therein sliced carrots which had been dipped in a broth comprising E. coli, S. typhosa and S. aureus at a level of about $10^6$ organisms/ml. The dichlorodifluoromethane was poured into a chilled 11.4 liter gas cylinder. The valve was screwed in place and the cylinder was then shaken and placed upside down in a rack; a 500 ml. Sample was removed through the valve and assayed for microorganism count by the procedure substantially as described in Example 4. Other 500 ml. samples were removed at timed intervals for assay.

The assay data are given in Table 9.

TABLE 9

| Elapsed Time (hrs.) | Assay (organisms/liter) |
|---|---|
| 0 | $1.7\times10^5$ |
| 0.5 | $3.4\times10^3$ |
| 1 | $2.7\times10^3$ |
| 1.5 | 610 |
| 2.0 | 180 |

EXAMPLE 7

This example demonstrates the use of flotation purification as a means of reducing the microorganism population of the fluorinated chlorohydrocarbon contact liquids of this invention when such means is integrated with a prior art heat extraction process and apparatus. In this example the flotation device of FIGS. 1 and 2 was employed with the heat extraction apparatus of FIG. 3. Since in this example food was simultaneously treated and frozen, the apparatus is hereafter referred to as a freezing apparatus. The system was operated with dichlorodifluoromethane in a manner similar to that described in connection with said figures. The inside dimensions of the housing of the flotation device were 4.4 meters × 1.5 meters. The inside diameter of the inlet pipe to the device was 25.4 cm.

Cob corn was treated and frozen at the rate of 1,820 to 4,540 kilograms/hour. The system was operated for nineteen days at about two eight hour shifts per day, seven days per week. Samples of corn, before and after treatment and freezing in the freezing apparatus, and samples of liquid, before and after treatment in the flotation device, were taken for assay on fourteen of the operating days. The charge of dichlorodifluoromethane in the freezing apparatus and the flotation device was maintained at 4,300 to 5,000 kilograms.

Contaminated liquid dichlorodifluoromethane was transferred from the freezing apparatus to the flotation purification device at the rate of 1,500 liters/minute (2,200 kilograms/minute). Up to 363 kilograms/hour of debris including water were removed by the foraminous belt. The net velocity of the upper surface of liquid dichlorodifluoromethane in the flotation device was about 7 meters/minute.

Representative food samples were taken at the entrance and 15 minutes later (the approximate residence time) at the exit of the freezing apparatus. Kernels of corn were removed from the cobs aseptically, macerated and plated in varying dilutions by the procedure substantially as described previously. A one-liter sample of dichlorodifluoromethane was removed from the inlet pipe of the flotation device and five minutes later another sample was removed from the exit pipeline before the liquid was recycled to the freezing apparatus. Samples were taken at the beginning, at the middle, and at the end of one of the eight hour shifts during each of the fourteen days of operation.

Table 10 shows actual counts of viable microorganisms in the dichlorodifluoromethane upon entering and upon leaving the flotation purification device and on the corn upon entering and upon leaving the contacting and freezing apparatus. Regarding the data, in all cases where steady state operation had been achieved, the output corn from the freezing and contacting system and the output dichlorodifluoromethane from the flotation device were significantly reduced in microorganism populations. In the few cases where the effectiveness of the invention was not apparent, it is believed that sampling took place during non-steady state conditions.

TABLE 10

Assay[1]

| Shift No.[2] | Corn In | Corn Out | Dichlorodifluoromethane In | Dichlorodifluoromethane Out |
|---|---|---|---|---|
| 1a | 72 | 40 | — | 7,100 |
| 1b | 260 | 1 | 1,000 | 78,000 |
| 1c | 80 | 20 | — | 1,600 |
| 2a | — | 40 | 5,000 | 1,000 |
| 2b | 310 | 20 | 520 | 680 |
| 2c | 150 | 10 | 7,900 | 2,140 |
| 3a | 10 | 3 | 3,900 | 3,000 |
| 3b | 140 | 10 | 400 | 280 |
| 3c | 110 | 10 | 581,000 | 5,000 |
| 4a | 5 | 8 | 100 | 440 |
| 4b | 10 | 10 | <3,000 | 520 |
| 4c | 10 | 7 | 800 | 460 |
| 5a | 10 | 20 | 400 | 80 |
| 5b | 70 | 4 | 200 | 160 |
| 5c | 65 | 50 | 500 | 3,100 |
| 6a | 40 | 8 | 180 | 320 |
| 6b | 120 | 5 | 1,880 | 580 |
| 6c | 60 | 12 | 180 | 6,900 |
| 7a | 220 | 210 | >30,000 | 3,900 |
| 7b | 10 | 4 | 620 | 540 |
| 7c | 4 | 2 | 3,840 | 760 |
| 8a | 140 | 20 | — | — |
| 8b | 120 | 10 | 3,900 | 220 |
| 8c | 290 | 10 | 29,700 | 1,020 |
| 9a | 140 | 5 | 33,800 | 320 |
| 9b | 200 | 20 | 10,700 | 300 |
| 9c | 100 | 10 | 19,200 | 1,700 |
| 10a | 200 | 10 | 24,700 | 760 |
| 10b | 60 | 1 | 8,700 | 120 |
| 10c | 190 | 20 | 10,600 | 960 |
| 11a | 20 | 1 | 26,300 | 1,060 |
| 11b | 30 | 1 | 20,400 | 840 |
| 11c | 120 | 20 | 13,300 | 1,420 |
| 12a | 60 | 1 | 9,800 | 920 |
| 12b | 120 | 50 | 8,700 | 560 |
| 12c | 40 | 40 | 11,400 | 620 |
| 13a | 260 | 30 | 24,700 | 5,300 |
| 13b | 120 | 20 | 16,400 | 1,740 |
| 13c | — | — | — | — |
| 14a | 170 | 20 | 18,100 | 5,300 |
| 14b | 70 | 20 | 7,000 | 1,580 |
| 14c | 120 | 20 | 7,000 | 520 |

[1] In (organisms/gram of corn) $\times 10^3$ or in orgaisms/liter of dichlorodifluoromethane
² Samples taken at the beginning of the shift = a; at middle of shift = b; at end of shift = c
>=greater; <=less than The embodiments of the invention in which an exclusive property or privilege is claimed are defined as follows:

1. A process for treating articles to reduce their microorganism populations comprising continuously carrying out in the absence of liquid water the steps of effectively contacting the surfaces of the articles with a liquid, saturated fluorinated chlorohydrocarbon having a normal boiling point of 50°C. to −50°C., collecting liquid chlorohydrocarbon which has contacted the articles, reducing the microorganism population of the collected liquid by means of propionic acid, chlorine, bromine or iodine, by bactericidal irradiation or by flotation purification, and recycling the liquid of reduced microorganism population to the article contacting step.

2. The process of claim 1 wherein the step of reducing the microorganism population of the collected liquid is carried out in a zone which is separated from the article contacting zone.

3. The process of claim 2 wherein the collected liquid is separated into a microorganism-rich fraction and a fraction having a lower microorganism population than the collected liquid and the latter fraction is recycled to the article contacting step.

4. The process of claim 3 wherein the collected liquid is flotatively separated into the two fractions.

5. The process of claim 3 wherein the microorganismrich fraction is separated into a microorganism-richer fraction and a fraction having a lower microorganism population than the collected liquid and the latter fraction is recycled to the article contacting step.

6. The process of claim 3 wherein the microorganism population of the microorganism-rich fraction is reduced to less than that of the collected liquid and the fraction after said reduction is then recycled to the article contacting step.

7. The process of claim 1 wherein the microorganism population of the collected liquid is reduced by adding propionic acid to the collected liquid in an amount effective to reduce the microorganism population thereof.

8. The process of claim 7 wherein the liquid and propionic acid are separated after the microorganism population of the liquid is reduced and before the liquid is recycled to the article contacting step.

9. The process of claim 1 wherein the microorganism population of the collected liquid is reduced by adding chlorine to the collected liquid in an amount effective to reduce the microorganism population thereof.

10. The process of claim 9 wherein the liquid and chlorine are separated after the microorganism population of the liquid is reduced and before the liquid is recycled to the article contacting step.

11. The process of claim 1 wherein the microorganism population of the collected liquid is reduced by irradiating the liquid with ultraviolet light.

12. The process of claim 1 wherein the articles are foods.

13. The process of claim 14 wherein the fluorinated chlorohydrocarbon is dichlorodifluoromethane.

14. The process of claim 12 wherein the fluorinated chlorohydrocarbon contacting the food also freezes the food.

* * * * *